Feb. 9, 1960 E. WEISS 2,924,383

CIRCUITRY FOR MULTIPLICATION AND DIVISION

Filed Dec. 11, 1953 7 Sheets-Sheet 1

INVENTOR:
Eric Weiss

By Mason, Mason & Sheridan
Patent Attorneys

CIRCUITRY FOR MULTIPLICATION AND DIVISION

Filed Dec. 11, 1953 7 Sheets-Sheet 2

INVENTOR:
Eric Weiss

By Mason, Mason & Sheridan
Patent Attorneys

| | | | | | | | | |
|---|---|---|---|---|---|---|---|---|
| Recirculate | $b_{32}=B_1D_1C$ | $b_{31}=B_{32}C$ | $b_{30}=B_{31}C$ | $b_5=B_6C$ | $b_4=B_5C$ | $b_3=B_4C$ | $b_2=B_3C$ | $b_1=B_2C$ |
| | ${}_ob_{32}=B_1'D_1C$ | ${}_ob_{31}=B_{32}'C$ | ${}_ob_{31}=B_{31}'C$ | ${}_ob_5=B_6'C$ | ${}_ob_4=B_5'C$ | ${}_ob_3=B_4'C$ | ${}_ob_2=B_3'C$ | ${}_ob_1=B_2'C$ |
| Recirculate with Shift → | $b_{32}=B_5D_1'C$ | $b_{31}=B_{32}C$ | $b_{30}=B_{31}C$ | $b_5=B_6C$ | | | | |
| | ${}_ob_{32}=B_5'D_1'C$ | ${}_ob_{31}=B_{32}'C$ | ${}_ob_{31}=B_{31}'C$ | ${}_ob_5=B_6'C$ | | | | |

INVENTOR:
Eric Weiss

By Mason, Mason & Sheridan
Patent Attorneys

INVENTOR:
Eric Weiss

By Mason, Mason & Sheridan
Patent Attorneys

INVENTOR:
Eric Weiss

By Mason, Mason & Sheridan
Patent Attorneys

| | |
|---|---|
| Division | $d_1 = K_1 P_{32} C$<br>$_0d_1 = K_1' P_{32} C$ |
| Multiplication | $d_1 = (E_3' + E_4') P_{32} C$<br>$_0d_1 = E_3 E_4 P_{32} C$ |

| Decimal Equivalent | $t_4$ | $t_3$ | $t_2$ | $t_1$ |
|---|---|---|---|---|
| 0 | 0 | 0 | 1 | 1 |
| 1 | 0 | 1 | 0 | 0 |
| 2 | 0 | 1 | 0 | 1 |
| 3 | 0 | 1 | 1 | 0 |
| 4 | 0 | 1 | 1 | 1 |
| 5 | 1 | 0 | 0 | 0 |
| 6 | 1 | 0 | 0 | 1 |
| 7 | 1 | 0 | 1 | 0 |
| 8 | 1 | 0 | 1 | 1 |
| 9 | 1 | 1 | 0 | 0 |

INVENTOR:
Eric Weiss

By Mason, Mason & Sheridan
Patent Attorneys

CIRCUITRY FOR MULTIPLICATION AND DIVISION

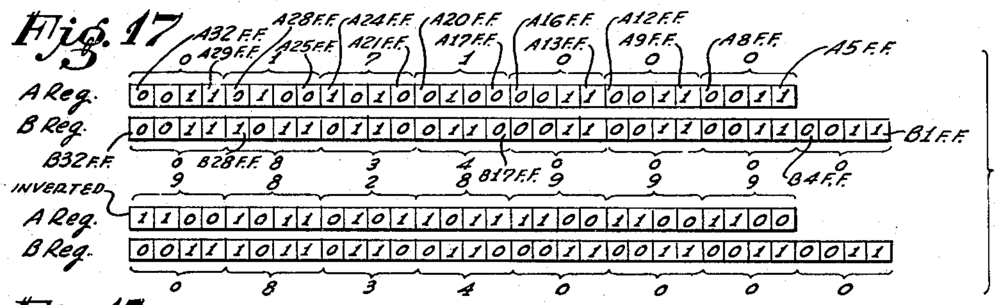
FIG. 17

FIG. 15

DIVIDEND .171÷.834 =.205+ QUOTIENT

| | Cyc. # | Register | | D1 Flip-Flop | E Register | Q Counter |
|---|---|---|---|---|---|---|
| Initial Conditions | | A (Dividend) | 0.1710000 | $D_1'$ | 000 | $R_0$ |
| | | B (Divisor) | 0.8340000 | | | |
| Conditions at Beginning of Cycles | #1 | A | 9.8289999 | $D_1'$ | 000 | $R_0$ |
| | | B | 0.8340000 | | | |
| | #2 | A | 9.8289999 | $D_1$ | 000 | $R_1$ |
| | | B | 0.0834000 | | | |
| | #3 | A | 9.9123999 | $D_1$ | 001 | $R_1$ |
| | | B | 0.0834000 | | | |
| | #4 | A | 9.9957999 | $D_1'$ | 002 | $R_1$ |
| | | B | 0.0834000 | | | |
| | #5 | A | 9.9957999 | $D_1'$ | 020 | $R_2$ |
| | | B | 0.0083400 | | | |
| | #6 | A | 9.9957999 | $D_1$ | 200 | $R_3$ |
| | | B | 0.0008340 | | | |
| | #7 | A | 9.9966339 | $D_1$ | 201 | $R_3$ |
| | | B | 0.0008340 | | | |
| | #8 | A | 9.9974679 | $D_1$ | 202 | $R_3$ |
| | | B | 0.0008340 | | | |
| | #9 | A | 9.9983019 | $D_1$ | 203 | $R_3$ |
| | | B | 0.0008340 | | | |
| | #10 | A | 9.9991359 | $D_1$ | 204 | $R_3$ |
| | | B | 0.0008340 | | | |
| Condition at End of Cycle | #10 | A | 9.9999699 | $D_1'$ | 205 (Answer) | $R_3$ |
| | | B | 0.0008340 | | | |

FIG. 16

PRODUCT .852 x .103 =.087756 MULTIPLIER

| | Cyc. # | Register | | D1 Flip-Flop | E Register | Q Counter |
|---|---|---|---|---|---|---|
| Initial Conditions | | A (Product) | 0.0000000 | $D_1'$ | 103 | $R_0$ |
| | | B (Multiplicand) | 0.8520000 | | | |
| Conditions at Beginning of Cycles | #1 | A | 0.0000000 | $D_1'$ | 896 | $R_0$ |
| | | B | 0.8520000 | | | |
| | #2 | A | 0.0000000 | $D_1$ | 968 | $R_1$ |
| | | B | 0.0852000 | | | |
| | #3 | A | 0.0852000 | $D_1'$ | 969 | $R_1$ |
| | | B | 0.0852000 | | | |
| | #4 | A | 0.0852000 | $D_1'$ | 699 | $R_2$ |
| | | B | 0.0085200 | | | |
| | #5 | A | 0.0852000 | $D_1$ | 996 | $R_3$ |
| | | B | 0.0008520 | | | |
| | #6 | A | 0.0860520 | $D_1$ | 997 | $R_3$ |
| | | B | 0.0008520 | | | |
| | #7 | A | 0.0869040 | $D_1$ | 998 | $R_3$ |
| | | B | 0.0008520 | | | |
| Condition at End of Cycles | #7 | A | 0.087756 (Answer) | $D_1'$ | 999 | $R_3$ |
| | | B | 0.0008520 | | | |

INVENTOR:
Eric Weiss

By Mason, Mason & Sheridan
Patent Attorneys

United States Patent Office 2,924,383

Patented Feb. 9, 1960

2,924,383

CIRCUITRY FOR MULTIPLICATION AND DIVISION

Eric Weiss, Los Angeles, Calif.

Application December 11, 1953, Serial No. 397,720

11 Claims. (Cl. 235—159)

This invention relates to digital computers and more particularly to computing circuits by which multiplying and dividing operations are carried out.

One of the objects of the invention is to provide novel multiplying-dividing circuitry in which common networks are utilized in carrying out both types of computation to the end that the structure of such circuitry is greatly simplified.

Another object of the invention is to provide a novel calculating circuit which may be selectively employed to perform multiplication or division to obtain a product or quotient, respectively.

Another object of the invention is to provide a calculating apparatus in which two numbers may be entered and in which, by the simple setting of a switch, the apparatus will generate either the product of the two numbers or the quotient of one of the numbers divided by the other.

Another object of the invention is to provide calculating apparatus whereby, in effect, both the dividing and multiplying operations are carried out by over-and-over additions.

Still another object of this invention is to provide novel circuits for performing the operations of multiplication and division on numbers represented in binary coded decimal systems.

Generally, the present invention provides a novel arrangement of circuitry associated with a first, second, and third storage register to perform either the process of multiplication or division of one number by another. Simplification of arrangement so that common circuitry can be employed for both calculations is primarily obtained by utilizing a novel method of subtraction which is made equivalent to addition by adding the true value of the subtrahend to the nines complement of the minuend, the sum being the nines complement of the remainder. Since the computation uses the minuend stored in its complemented form, the advantages of this approach are carried throughout the process.

As a result of the above, after having once set up the registers with the necessary digital information (i.e., complementing the dividend or the multiplier), the process of multiplication or division, as far as the circuitry is concerned, is reduced to identical successive adding and shifting computation steps. The only difference in the multiplication and division processes is the criterion used to determine the number of times the adding step should be repeated before switching to the shifting step. The state of a decision flip-flop determines this selection. Thus, when performing the process of division, the state of the decision flip-flop during a computation step is dependent upon a previous comparison of the divisor digits in the second register with the true partial remainder digits obtained by complementing the digits being stored in the first register. On the other hand, when performing the process of multiplication, the state of the decision flip-flop during a computation step is dependent upon a previous sensing of the value of the digit in the controlling digital position of the third register in which the complement of the multiplier is being stored.

Other objects of the invention will be pointed out in the following description and claims and illustrated in the accompanying drawings which disclose, by way of example, the principle of the invention and the best mode which has been contemplated of applying that principle.

In the drawings:

Fig. 15 is a diagram illustrating the mathematical procedure involved in the valuation of a problem in division.

Fig. 16 is a similar diagram illustrating the solution of a problem in multiplication.

Fig. 17 illustrates how the binary coded decimal numbers representing the dividend and the divisor are initially set-up in the A and B registers, respectively.

Figure 1:
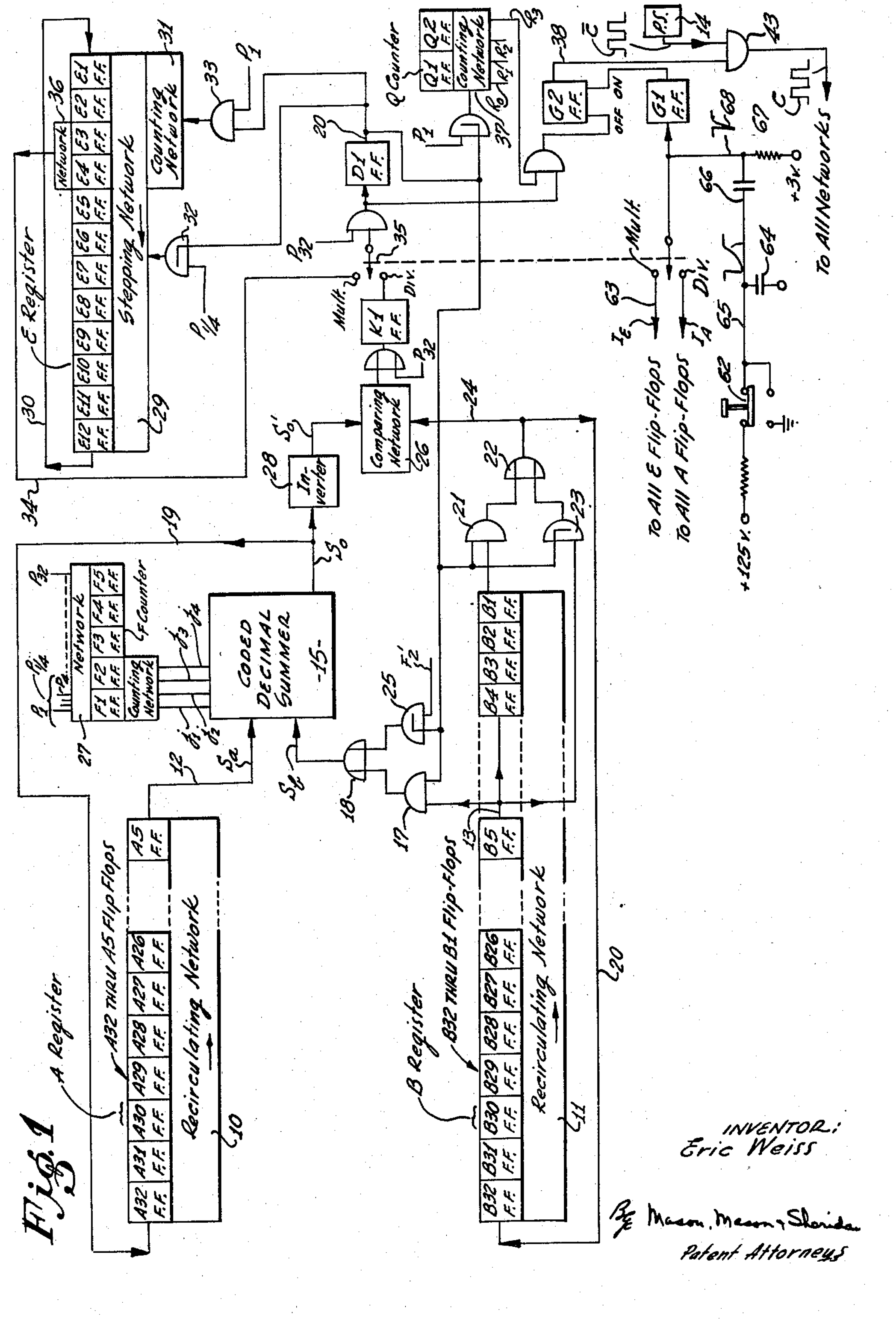
Fig. 1 shows an overall block diagram of the circuits of the preferred embodiment of the present invention.

Referring to Fig. 1, an overall schematic block diagram of the preferred embodiment of the computing circuitry of the present invention is shown. This device is comprised of an A register, a B register, and an E register which provide the means for storing numerical data during the computations. This numerical data is stored therein in the binary coded decimal system.

Of these, the A and B registers function as recirculating registers which cooperate with a coded decimal summer circuit 15, to serially add the contents of the B register into the A register.

As shown in the diagram, the A register is comprised of a series of flip-flop circuits designated A5 to A32, inclusive, together with a recirculating network 10; while the B register is comprised of a series of flip-flop circuits designated B1 to B32, inclusive, together with a recirculating network 11. During the computation period, the recirculating networks for both these registers function, in response to a steady rate of clock pulses C received from a pulse source 14, to step data being stored in each flip-flop to the next in the series, stepping in order from the higher order flip-flop designations to the lower.

Output 12 from the A5 flip-flop of the A register and output 13 from the B5 flip-flop of the B register are connected to inputs $S_a$ and $S_b$, respectively, of coded decimal summer circuit 15. The connection of the A5 flip-flop is direct, whereas the B5 flip-flop is connected by way of a gate 17 and a mixer 18. The output $S_0$ of the summer circuit 15 is routed as schematically indicated by a line 19 back into the A32 flip-flop, thus completing the recirculating path for the A register.

The data in the B5 flip-flop, in addition to being routed into the $S_b$ input of summer 15, is capable of being recirculated, as schematically indicated by line 20, back to the B32 flip-flop of the B register by either of two paths. One of these paths connects the output of the B5 flip-flop through the series of four flip-flops, B4 through B1, whose output is then connected to line 20 by way of a gate 21 and a mixer 22. The other path connects the output of the B5 flip-flop to line 20 by way of a gate 23 and the mixer 22, thereby by-passing the series of four flip-flops B4 through B1.

The summer circuit 15 cyclically operates on groups of four serially disposed binary digits representing coded decimal digits received on its inputs $S_a$ and $S_b$ to generate groups of four serially disposed binary digits on output $S_0$ corresponding to their sum. The summer circuit 15 has a four clock pulse period delay. Thus, when it is desired to add corresponding digits of the B register into the A register, and simultaneously recirculates the contents of the B register such that its digits are not shifted with respect to the sum digits, gates 17 and 21 are opened. This permits the binary digits on the output of the B5 flip-flop to be fed into the summer circuit 15 and simultaneously recirculated in the B register by way of the series of flip-flops B4 down through B1. Stepping the data through these latter flip-flops provides the four clock pulse delay needed in the B register recirculation to match the four clock pulse delay imposed on the sum digits being introduced into the A register recirculation path by the summer circuit 15.

Figures 13, 14:
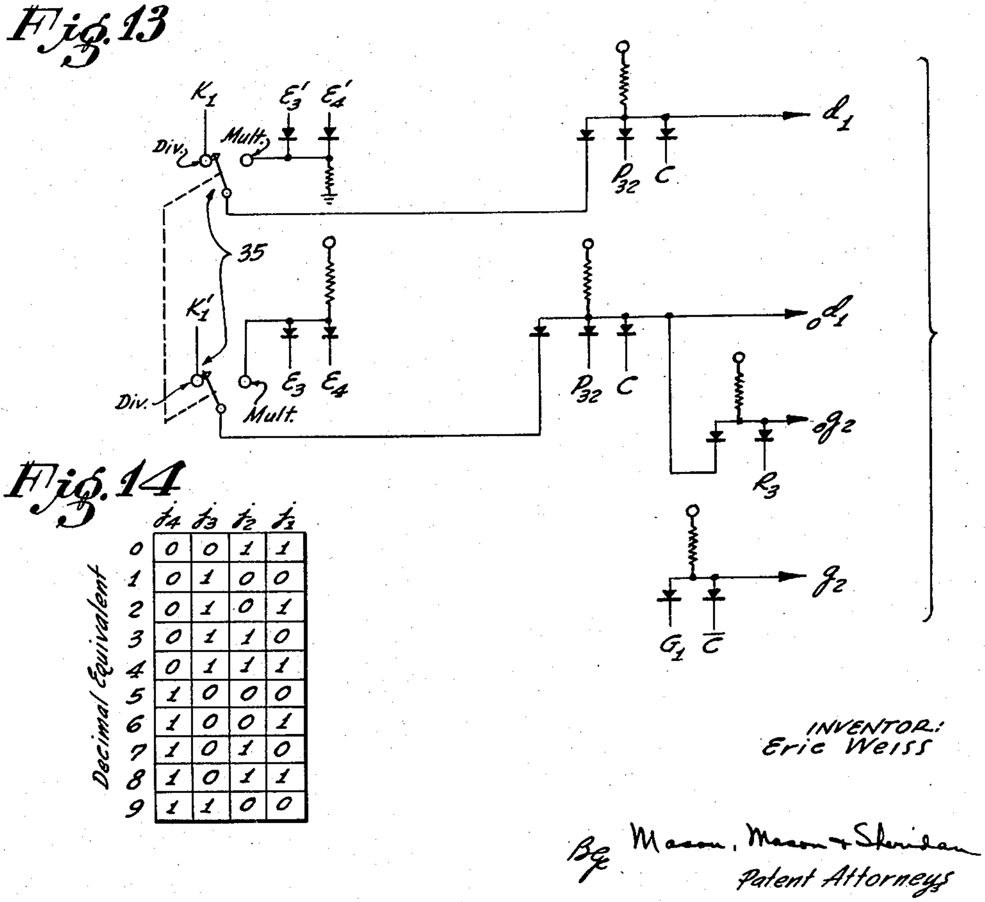
Fig. 13 is a schematic diagram of the trigger networks for the D1 flip-flop.
Fig. 14 shows a table of the binary coded system used for representing the decimal digits in the present circuitry.

When it is desired to inhibit the addition process from taking place, that is, recirculate the contents of the A register without change, and simultaneously recirculate the contents of the B register such that its binary digits are shifted four binary positions, or one decimal digit, ahead of corresponding digits being recirculated in the A register, gates 25 and 23 are opened. Gate 25 permits a series of binary digits represented by the voltage on a line $F_2'$ to pass into the summer 15. This output $F_2'$ corresponds to the output of the F2 flip-flop of an F counter which operates in such a manner during the computation periods as to generate successive groups of binary digits equivalent to coded decimal digits "zero" (Fig. 14). The introduction of the decimal digits "zero" on input $S_b$ thus results in passing the digits of the A register through the the coded decimal summer 15 without change. As previously described, gate 23 permits digits set-up in the B5 flip-flop to be recirculated in the B register such that they by-pass the series of flip-flops B4 down through B1, resulting in advancing the contents of the B register one decimal position to the right.

The computation cycle of the present computing system is equivalent to a count of 32 clock pulses C, or the number of clock pulses required to recirculate information once in the A register. A cycle counter, designated the F counter, is provided for performing this cycle count. This F counter is comprised of flip-flops F1 to F5, inclusive, which are interconnected by a network 27 so as to have the capacity count of 32. The counts of the F counter are indicative of the location of data in the A and B recirculating registers; or, stated in another way, each count indicates the step of the compustation cycle through which the circuits have advanced. Of these, counts $P_1$ and $P_{32}$ of the cycle, as well as the count periods $P_1$ through $P_4$, designated $P_{1/4}$, are necessary to the present computation and are evidenced by signals on correspondingly designated lines derived from the network 27.

The first two flip-flops, F1 and F2, of the F counter have an additional separate cyclical counter action of their own operating with a capacity of four counts; namely, $j_1$, $j_2$, $j_3$, and $j_4$. These counts are energized, in order (during the operation of the computing circuitry), to define the four binary digits representing the successive coded decimal digits being fed into the summer circuit 15. As above noted, the summer circuit 15 operates to serially receive binary coded decimal digits simultaneously on inputs $S_a$ and $S_b$ and, after a four clock period delay, to serially emit a binary coded decimal digit corresponding to the sum of the inputs. The details of the coded decimal summer 15 are not a part of the present invention and the summer may take several forms, one embodiment of which is shown, described, and claimed in Patent No. 2,775,402, issued on December 25, 1956, to Eric Weiss.

It is believed that the detailed interconnecting arrangement, using logical design techniques, of the F counter and the Q counter, is well understood in the art. Reference to details of similarly arranged counters, having various radices, can be found, for example, in Patent No. 2,644,887, issued on July 7, 1953, to Albert E. Wolfe, Jr. Furthermore, the Q counter of the present invention is identical to the F counter shown in the previously referenced Weiss Patent No. 2,775,402.

The output from mixer 22, in addition to being recirculated via line 20 into the B32 flip-flop of the B register, is fed by way of connection 24 into a comparing network 26 along with the output $S_0'$ from an inverter 28 which inverts the signals being fed on output $S_0$ from the summer circuit 15.

Comparing network 26 thus operates during the division routine to compare the magnitude of the true value of the dividend or partial remainder (as distinguished from the complemented contents of the dividend or partial remainder being stored in the A register) with the true contents of the B register. Whenever the former is equal to, or greater than, the latter, a K1 flip-flop is triggered true. As will be explained in the ensuing description, during division, switch 35 connects the output of the K1 flip-flop to the input of the D1 flip-flop such that at the end of each computing cycle, the D1 flip-flop is set in accordance with the results of the comparison during the computing cycle.

It should be noted at this point that the output 20 of the D1 flip-flop is connected to each of the gates 17, 25, 21, and 23. The symbols for gates 17 and 21 represent gates which are open when the D1 flip-flop is in a true state, while the symbols for gates 25 and 23 represent gates which are open when the D1 flip-flop is in a false state. It is thus obvious that the operations of these gates during each computation cycle, as above described, is controlled by the state of the D1 flip-flop.

Next to be described is the E register which is comprised of a series of flip-flops E1 to E12, inclusive. Associated with the E register is a stepping network 29 which is actuated by clock pulses C during the first four clock pulses of a cycle; that is, when the signal $P_{1/4}$ is passed through a gate 32. As noted by the symbol used for gate 32, this action is dependent on the D1 flip-flop being in a false state and results in stepping the contents of the E register one decimal digit position to the left, thus shifting the contents of the E1 to E4 flip-flops into the E5 to E8 flip-flops, respectively, and the contents of the E9 to E12 flip-flops, as schematically indicated by connection 30, into the E1 to E4 flip-flops, respectively.

As an alternate operation, the E1 to E4 flip-flops are provided with a counting network 31 which is rendered operable when the $P_1$ pulse counts of the F counter are permitted to pass through a gate 33 into counter network 31. This action is dependent on the D1 flip-flop being in a true state and results in increasing the contents of the E1 to E4 flip-flops by unity. It should thus be noted that the state of the D1 flip-flop likewise controls whether the stepping network 29 or the counting network 31 is effective during a computation cycle.

In summary, the state of the D1 flip-flop during a computation cycle controls whether gates 17, 21, and 33 are opened, or whether gates 23, 25, and 32 are opened. As will be made more evident in the ensuing description, one or the other of these groups of gates is made effective in accordance with the state of the D1 flip-flop during both the multiplication and division routines.

As already stated, during division the mechanical switch 35 is set such that the D1 flip-flop is conditioned by the results of the comparing network 26. On the other hand, during multiplication the mechanical switch 35 is set to connect the output 34 of a network 36, associated with the E3 and E4 flip-flops, to the input of the D1 flip-flop. The arrangement of network 36 is based on the fact that any time both the E3 and E4 flip-flops store a digit 1 therein, the coded decimal digit "9" is being stored in the E1 to E4 flip-flops (see Fig. 14). Thus, whether this content is "9" or "not 9" is the criterion which determines the true or false setting, respectively, of the D1 flip-flop during each computation cycle of the multiplication routine.

One other counter, designated the Q counter, is required as an auxiliary to performing computations on the present device. This counter is comprised of flip-flops Q1 and Q2 and a counting network 37 which interconnects the flip-flops such that they define a capacity of four counts indicated by outputs $R_0$, $R_1$, $R_2$, and $R_3$, respectively. As shown, this counter likewise responds to the $P_1$ pulse count of a computation cycle, dependent on the D1 flip-flop being in a false state. The Q counter operates as a means for indicating when the E register has shifted its contents left three times, and thus completed the computation. This is done by using the $R_3$ output to trigger a G2 flip-flop into an "off" or "false" state. The output 38 from the G2 flip-flop then closes clock gate 43 thus preventing clock pulses C from further energizing the circuitry.

As will be made clearer in the ensuing description, the A, B, and E registers, the summer circuit 15, the F counter, and the Q counter, together with their associated networks, represent circuitry which is utilized during both the division and multiplication routine. As pointed out, the D1 flip-flop is also used during both routines to determine whether one or the other of two alternative operations is to be performed by these circuits during each of the computation cycles.

The mode of operation of the flip-flop circuits of the present invention, which represent logical propositions in the system of logic to be performed, will be made clear by first presenting a detailed description of the E1 flip-flop circuit shown in Fig. 8.

The flip-flop circuit as used in the present embodiment of the invention is well known in that it is comprised of two triodes, $V_1$ and $V_2$, each of which has its plate cross-coupled to the grid of the other by a resistor R in parallel with a capacitor C. The plate of each of the triodes is connected through a separate load resistor, like resistor $R_1$, to a positive 225 v. D.C. source, and the cathode of each triode is grounded. Each of the grids of the tubes is joined through a grid resistor, like grid resistor $R_2$, to a negative bias of −300 v. The flip-flop circuit is further provided with triggering circuits each connected to a respective one of its grids and output circuits each connected to a respective one of its plates.

Whenever the flip-flop is considered to be in a "one" state, neon light L, connected in series with a limiting resistor $R_0$ across the left load resistor $R_1$, lights up; and when the flip-flop is in a "zero" state, neon light L is out.

The output lines $E_1$ and $E_1'$ from the E1 flip-flop are taken from the right and left plates, respectively. In order to maintain the swing of the plate voltage between voltage levels +125 v. and +100 v., clamping diodes, such as diodes 39 and 40 associated with the right output $E_1$, are provided on each of the output lines.

The trigger inputs to the flip-flop circuit are controlled by logical networks associated with the grids of the $V_1$ and $V_2$ tubes. The outputs of the logical networks are coupled to the respective triode grids through differentiating circuit means and blocking diode means, as shown at 41 and 42, respectively, for the left grid, the grid of tube $V_1$. As will be more clearly explained, any time all the inputs to a logical network, such as network 44, are high in potential, a pulse similar to the clock pulse C is impressed onto the differentiating network 41. The sharp negative pulse, created by differentiating the trailing edge of the pulse, passes through blocking diode 42 and results in triggering the E1 flip-flop into a "zero" state characterized by output $E_1'$ being at the high potential of +125 v. and the output $E_1$ being at the low potential of +100 v.

In order to simplify the presentation of the invention, the remaining flip-flop circuits of the system, which are all similar to the E1 flip-flop, are shown in block diagram form. Thus, as noted in Fig. 2, for example, each of the flip-flop block diagrams is provided with a pair of output lines. The output line having a high potential determines the effective term of the proposition represented by the flip-flop circuit. The other output line, having necessarily a low potential, then represents the ineffective term. Furthermore, each of the flip-flop block diagrams is provided with a pair of trigger inputs, one of which controls each of the states of the flip-flop circuit.

Before going further into a description of the details of the remaining circuits of the invention, it will be pointed out how the arrangement of the inputs and the outputs of the flip-flop circuits of the present invention enables the detailed logical circuitry for performing the present process to be defined by logical equations.

First to be noted is that the inputs and outputs of all the flip-flop circuits of the present invention are defined in a systemmatic manner by using the following standard nomenclature: Each of the proposition flip-flops is designated by the combination of a capital letter and a number, and the outputs of each of the flip-flop circuits are characterized by a corresponding capital letter with the number as a subscript. In order to characterize the true state output of a flip-flop from the false, the latter is distinguished from the former by an affixed prime. Furthermore, the inputs of a flip-flop circuit which trigger it into a true or false state are designated by a corresponding lower case letter with the number as a subscript. The input for rendering the flip-flop false is further characterized by a subscript zero prefixing the lower case letter.

A logical equation, as herein used, defines the validity of a flip-flop trigger input in terms of the validity of the proposition flip-flops. The true and false conditions of a proposition flip-flop are preferably referred to as respective terms which are represented within the circuits by D.C. voltage at a specified point in the circuits. As previously stated, this voltage can exist at either of two D.C. levels, e.g., 100 v. or 125 v. When a term is effective, its voltage is at the high level of 125 v.; and when the term is ineffective, its voltage is at the low level of 100 v.

Presented below the block diagram of the respective flip-flop circuits are the logical equations which define the conditions as to when and how the flip-flop circuits are subject to change at the end of a clock period, in accordance with the effective terms of the system, so as to perform the function desired.

A logical equation for the grid triggering of a flip-flop circuit consists of stating the terms which have to be effective, i.e., of a high potential during a clock period, in order that the flip-flop circuit will trigger into a particular state at the end of the clock period. Two operators are used in forming the equations. The first, "logical multiplication," means that all the terms in the particular product have to be of a high potential in order to make that product effective in a particular equation. The second, "logical addition," means that at least one term of the sum has to be of a high potential in order to make that sum effective in a particular equation.

Figure 10:
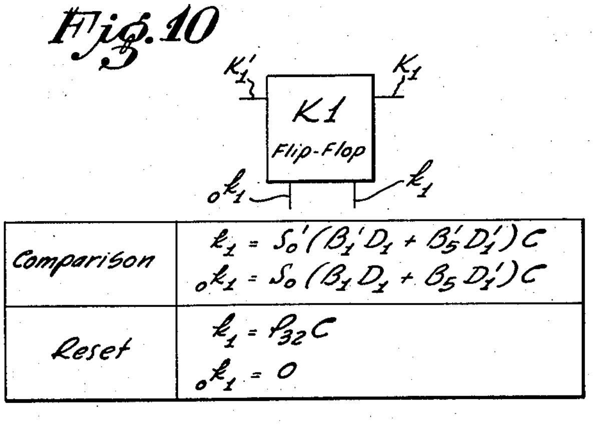
Fig. 10 shows a block diagram of the K1 flip-flop circuit together with the logical equations defining its trigger inputs.

Thus, for example, the equation:

$$k_1=S_0'(B_1'D_1+B_5'D_1')C$$

is interpreted as meaning that the K1 flip-flop will be triggered into the "true" state at the end of the clock period C during which the terms $S_0'$ and $(B_1'D_1+D_5'D_1')$ are at a high potential, where $(B_1'D_1+B_5'D_1')$ itself will be of a high potential whenever both the terms $B_1'$ and $D_1$, or both the terms $B_5'$ and $D_1'$ are simultaneously of a high potential (see Fig. 10).

Figure 2:
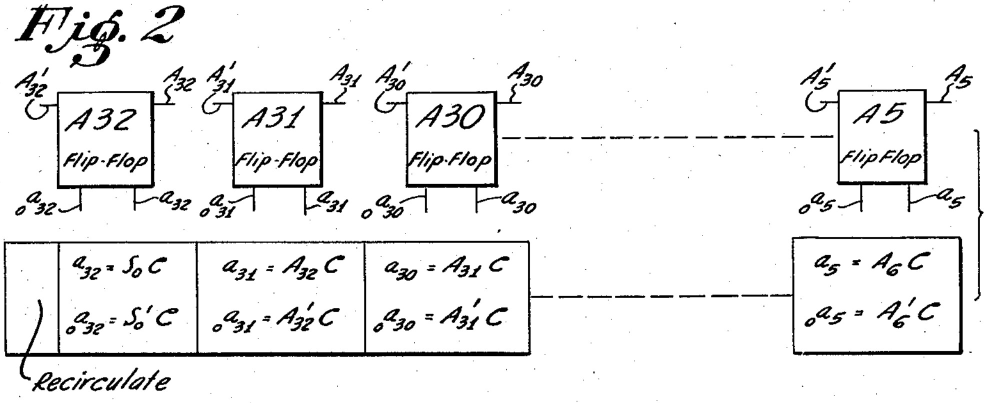
Fig. 2 shows a block diagram of the flip-flop circuits for the A register together with the logical equations defining their trigger inputs.

Reference will next be made to Fig. 2 which shows block diagrams of the A register flip-flops A5, . . . A30 to A32, inclusive, together with the logical equations which define their trigger inputs such that information may be shifted toward the right, on successive clock pulses C, from each flip-flop to the next following flip-flop. Thus note, for example, that the true input of the A31 flip-flop is defined by logical equation $a_{31}=A_{32}C$. This equation is no more than a statement that, whenever the $A_{32}$ output is high in potential during a clock period, the A31 flip-flip will be triggered into a true state at the end of the clock pulse period or clock pulse C. Similarly, the false input of the A31 flip-flop is defined by logical equation ${}_0a_{31}=A_{32}'C$. This latter equation states that, whenever the $A_{32}'$ output is high in potential during a clock period, the A31 flip-flop will be triggered into a false state at the end of the clock period. The trigger inputs to the A32 flip-flop are $a_{32}=S_0C$ and ${}_0a_{32}=S_0'C$. Thus the outputs of the summer circuit; namely, $S_0$ and $S_0'$, are stepped at the end of clock pulse C into the A32 flip-flop. It should now be understood how the A register flip-flops, together with the summer circuit 15, provide a recirculating path for information stored therein.

Figure 3:
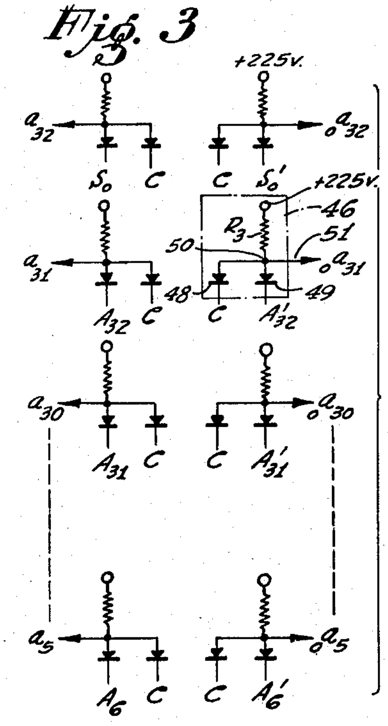
Fig. 3 is a schematic circuit diagram of the trigger logical networks for the A register flip-flops.

Fig. 3 shows the logical networks; namely, product networks or "and networks," such as 46, which are used to generate the trigger equations for the A register flip-flops. Product network 46 is comprised of a pair of input crystal diodes 48 and 49 joined to a common junction 50 connected through a resistor $R_3$ to the positive potential source of 225 v. These diodes are orientated such that whenever the input signals on both diodes are at the high potential of +125 v., the output 51, connected to common junction 50, is at the high potential of +125 v. Any time one or both of the diode inputs have the low signal potential of +100 v. thereon, output 51 is at this low signal potential.

Figure 4:
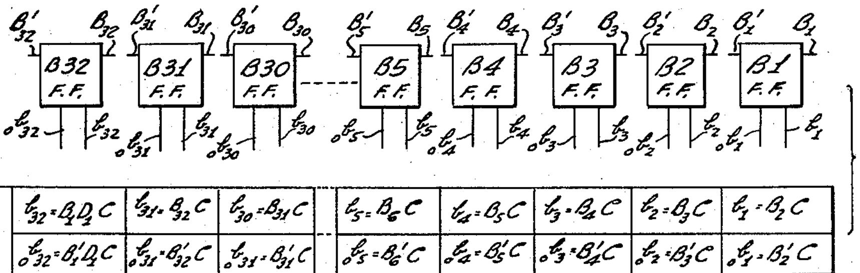
Fig. 4 shows a block circuit diagram of the flip-flop circuits for the B register together with the logical equations defining their trigger inputs.
Figure 5:
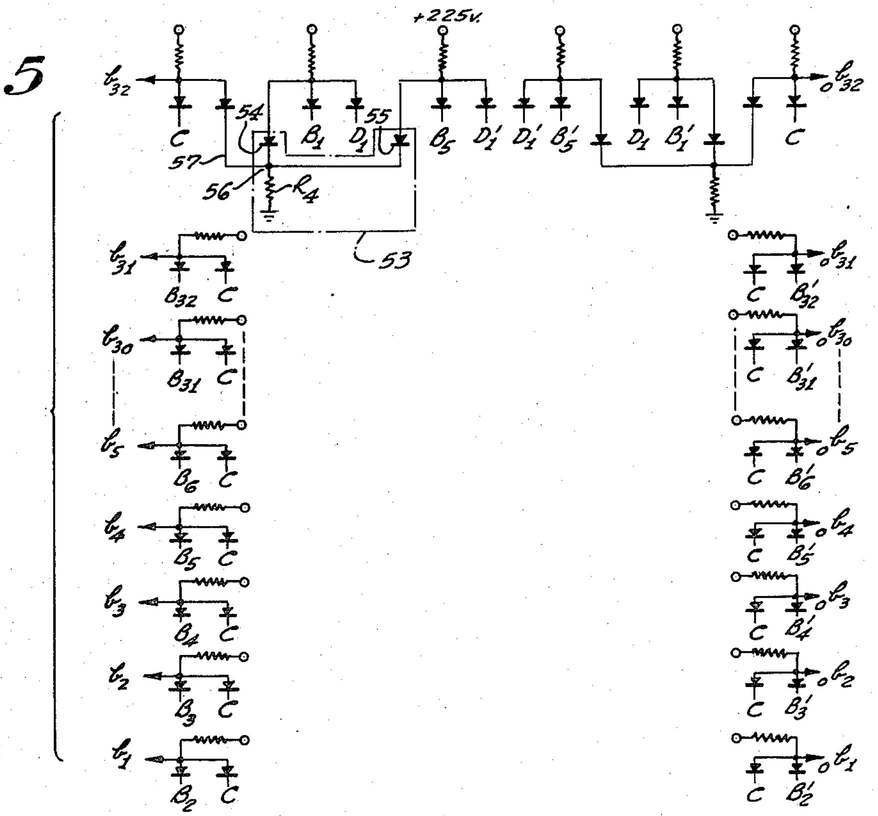
Fig. 5 is a schematic circuit diagram of the trigger logical networks for the B register flip-flops.

Fig. 4 shows the block diagrams of the B register flip-flops, B1 to B5, . . . B30 to B32, inclusive. These flip-flops, similarly to the A register flip-flops, are provided with a pair of outputs and a pair of inputs. The trigger equations for the B register flip-flops are shown below their respective block diagrams. These trigger equations provide for two types of stepping or recirculation. The first set of equations shown defines the process of stepping information from each flip-flop toward the one with the next lower number designation in the manner described above for the A register flip-flops. As previously noted in connection with Fig. 1, the output of the B5 flip-flop can be routed into either the B4 flip-flop or directly into the B32 flip-flop, depending on the state of the D1 flip-flop. The first set of trigger equations in Fig. 4 describes the recirculating action when the D1 flip-flop is in a true state, thus causing the output of flip-flop B1 to be routed into the B32 flip-flop as indicated by equations: $b_{32}=B_1D_1C$ and ${}_0b_{32}=B_1'D_1C$. The second set of trigger equations describe the recirculating action when the D1 flip-flop is in a false state, thus causing the output of flip-flop B5 to be routed into the B32 flip-flop. The latter action is described by trigger equations: $b_{32}=B_5D_1'C$ and ${}_0b_{32}=B_5'D_1'C$. It should be understood that although two sets of equations are shown, the only variation in the trigger equations is for the B32 flip-flops. Hence the logical network for generating these equations, as shown in Fig. 5, need merely provide for generating the equations for the B5, . . . B30 and B31 flip-flops once. The alternative of stepping information into the B32 flip-flop from either flip-flop B1 or B5 is handled by feeding the outputs of these flip-flops into a logical sum network, such as network 53. This sum network or "or" network is comprised of a pair of input crystal diodes 54 and 55 joined to a common junction 56 which is returned to ground through a resistor $R_4$. These diodes are orientated so that whenever the signals on either one of the inputs is at the high potential of +125 v., the output 57 of the sum circuit, connected to the common junction 56, is at the high potential of +125 v. When neither of the inputs is high in potential, the output 57 is at the low potential of +100 v.

Figure 6:
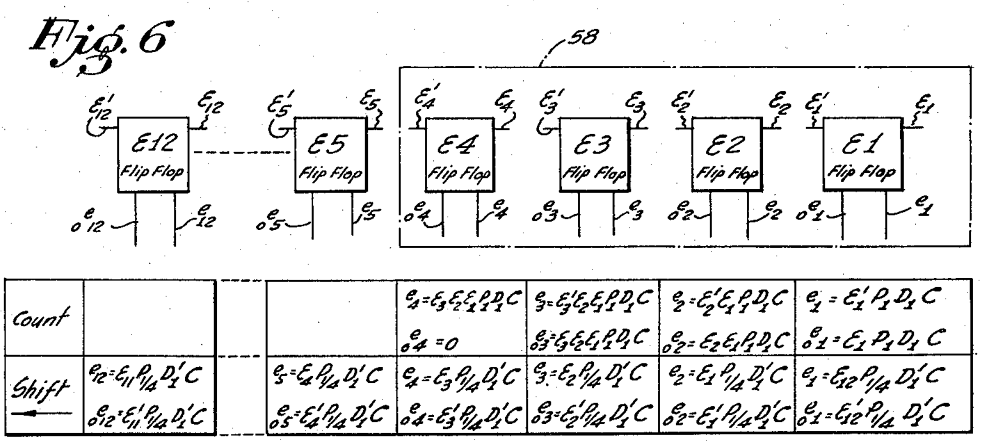
Fig. 6 shows a block diagram of the flip-flop circuits for the E register together with the logical equations defining their trigger inputs.

Referring to Fig. 6, the block diagrams are shown for the E register flip-flops E1 to E5 . . . E12. These flip-flops, likewise, each have a pair of outputs and a pair of inputs designated in accordance with the standards previously described. The logical equations below the E flip-flops indicate that the counting function is performed by counter 58, which comprises only flip-flops E1 to E4; while the shifting function is performed by the use of all the flip-flops in the E register.

The counter arrangement of flip-flops E1 to E4 is a parallel one in that the pulses to be counted; namely, the $P_1$ pulses, are applied to all the flip-flop inputs simultaneously. The interconnections of the flip-flop output, however, only allow certain flip-flops to be triggered by the successive $P_1$ pulses so as to change their states in an orderly fashion to indicate the successive decimal digit outputs in accordance with the table of Fig. 14. This table shows a well-known binary coded decimal system for representing digits.

To understand this counter arrangement, it should be noted that the connections of the outputs of the flip-flops to the right input of a particular flip-flop, i.e., the input which when energized will trigger the flip-flop in question into a "true" state, are determined by examining the states of all the flip-flops whenever the flip-flop in question is to change from a "zero" to a "one." On the other hand, the connections of the outputs of the flip-flops to the left input of a particular flip-flop, i.e., the input which renders the flip-flop "false," are determined by examining the states of all the flip-flops whenever the flip-flop in question is to change from a "one" to a "zero." The coincidence of these flip-flop states are thus represented as logical products made up of the terms representing the flip-flop outputs. For example, examine the states of the flip-flops in the table when it is desired to trigger the E1 flip-flop into a true state, i.e., have a "one" therein on occurrence of the next $P_1$ pulse. It is noted that a sufficient condition is that the E1 flip-flop be in a false state and the D1 flip-flop be in a true state. Thus it follows that $e_1=E_1'P_1D_1C$.

The trigger equations for the remaining flip-flops, E2, E3, and E4, are determined in a similar manner.

The second set of equations for the E flip-flops functions to shift the contents of the E register one decimal digit, that is, four binary positions to the left, during pulse times $P_{1/4}$ of the computation cycles. This action is dependent on the D1 flip-flop being in a false state. Thus it should be noted that each of the trigger equations for this action includes the outputs of the flip-flop to the right (as shown in Fig. 6) in a similar manner in which the shift trigger equations for the A and B registers include the outputs of the flip-flop to the left (as shown in Figs.

Figure 7:
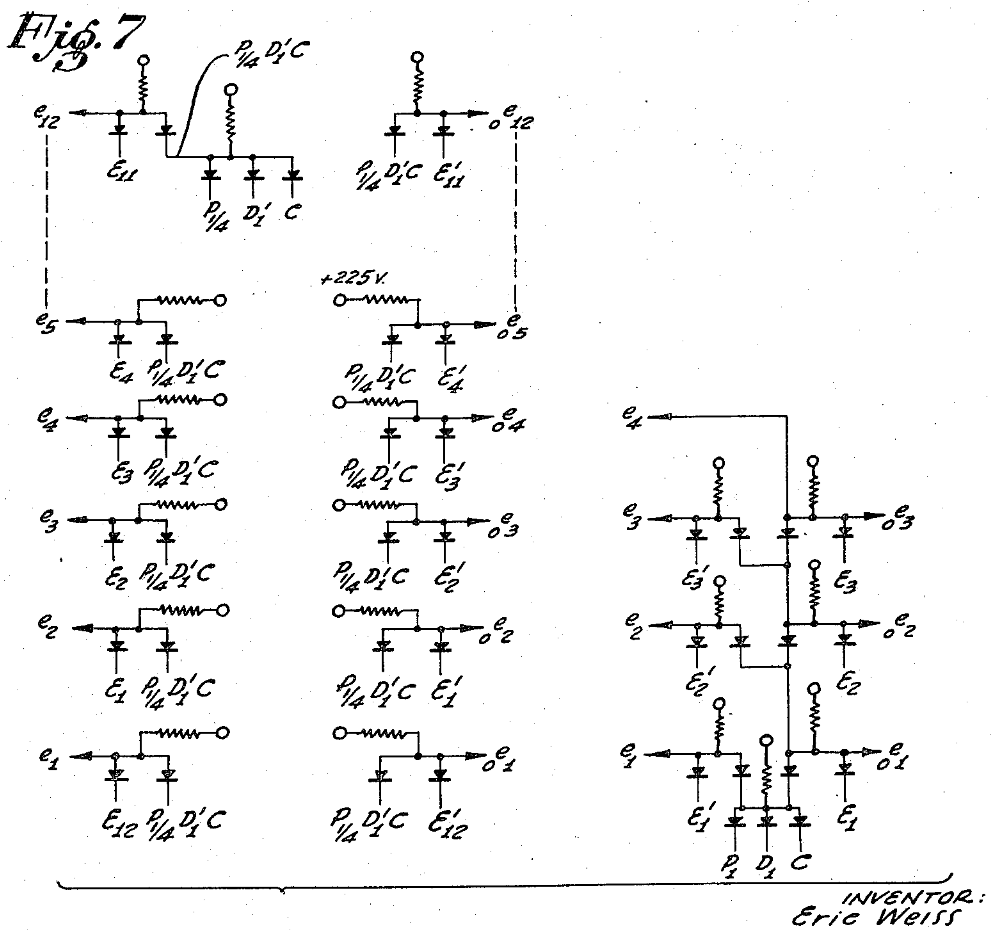
Fig. 7 is a schematic circuit diagram of the trigger logical networks for the E register flip-flops.

2 and 4). The stepping action of the E register, however, is limited to the pulse periods $P_{1/4}$, and consequently is not a continuous recirculation action. The logical networks for generating the trigger equations for the E register flip-flops are shown in Fig. 7 and will not be further described except for stating that, since the counting logical equations can be most conveniently generated by a cascade type of network, they are so grouped together and generated by the network at the lower right of Fig. 7.

The block diagram of the K1 flip-flop, together with its trigger equations, is shown in Fig. 10. This flip-flop, which is used only during the division routine, is initially reset into a true state at the beginning of each computation cycle as evidenced by the reset equation $k_1=P_{32}C$. During each computation cycle, the binary digits on the output $S_0$ from the summer 15, as represented by their logical inverse $S_0'$, are compared with the B register data taken from mixer 22. This B register data may be either the B1 flip-flop output or the B5 flip-flop output, depending on whether the D1 flip-flop is true or false. Thus when the $D_1$ output is high in potential (+125 v.), gate 21 (Fig. 1) is open and the K1 flip-flop is triggered true by equation $k_1=S_0'B_1'D_1$ and triggered false by equation ${}_0k_1=S_0B_1D_1$. The $S_0'$ output represents the waveform of the complement of the number content of the A register, corresponding to the dividend or partial remainder. This dividend was originally complemented when the circuits were initially energized. Inverting the output $S_0$ of the summer 15 by means of inverter 28 results in uncomplementing the number being recycled back into the A register. This uncomplemented number is represented by waveform $S_0'$. On comparing the series of digits when term $D_1$ is high in potential, depending on whether $S_0'B_1'$ or $S_0B_1$ is the last set of conditions to be true, as observed through pulse time $P_{28}$ of the computation cycle, the K1 flip-flop is set true or false, respectively.

Similarly, when term $D_1'$ is high in potential, depending on whether $S_0'B_5'$ or $S_0B_5$ is the last set of conditions to be true, as observed through pulse time $P_{28}$ of the computation cycle, the K1 flip-flop is set true or false, respectively. It should be noted that the last coded decimal digit in each of the numbers being compared is necessarily equivalent to a decimal "zero." This explains the reason for stating that the comparison is made only through pulse time $P_{28}$ of the cycle.

The result of the above logical combination of the trigger inputs is that the K1 flip-flop is set true if the true form of the dividend or partial remainder is equal to or greater than the true form of the divisor (B register). This is equivalent to the K1 flip-flop being set true if the addition of the contents of the B register to the A register does not result in an overflow. If the true form of the dividend or partial remainder is less than the true form of the divisor, the K1 flip-flop is set false.

Figure 11:
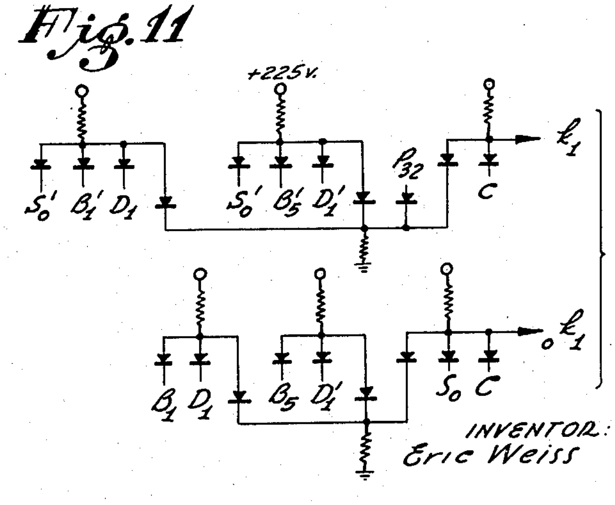
Fig. 11 is a schematic circuit diagram of the trigger logical networks for the K1 flip-flop.

The above trigger equations for the K1 flip-flop are electronically generated by the logical network shown in Fig. 11, which should now be understood in view of the prior descriptions of similar networks.

Figure 12:
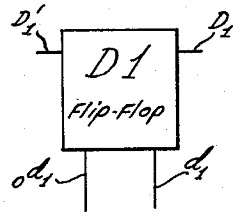
Fig. 12 shows a block diagram of the D1 flip-flop circuit together with the logical equations defining its trigger inputs.

The D1 flip-flop shown in Fig. 12 is set true or false at the end of the $P_{32}$ pulse time of a division computation cycle, in accordance with the true or false setting, respectively, of the K1 flip-flop, as denoted by trigger equations $d_1=K_1P_{32}C$ and ${}_0d_1=K_1'P_{32}C$. On the other hand, the D1 flip-flop is set at the end of $P_{32}$ time of a multiplication computation cycle, in accordance with the contents of the E3—E4 flip-flops of the E register. Referring to the table in Fig. 14, whenever positions $j_3$ and $j_4$ of the four place binary code (as stored in flips-flops E3 and E4) are both equivalent to a binary digit "1," the contents of the E1–E4 flip-flop combination is equivalent to decimal "nine" and the D1 flip-flop is set false at $P_{32}$ pulse time as denoted by equation ${}_0d_1=E_3E_4P_{32}C$. On the other hand, whenever either position $j_3$ or $j_4$ is equivalent to a binary digit "0," the contents of E1–E4 is equivalent to one of the decimal digits 0 to 8, inclusive, or "not nine," and the D1 flip-flop is set true at $P_{32}$ pulse time as denoted by equation $d_1=(E_3'+E_4')P_{32}C$. As shown in Fig. 13, the setting of two way mechanical switch 35 determines whether the division or multiplication trigger equation networks are to be connected to the input of the D1 flip-flop.

Figure 8:
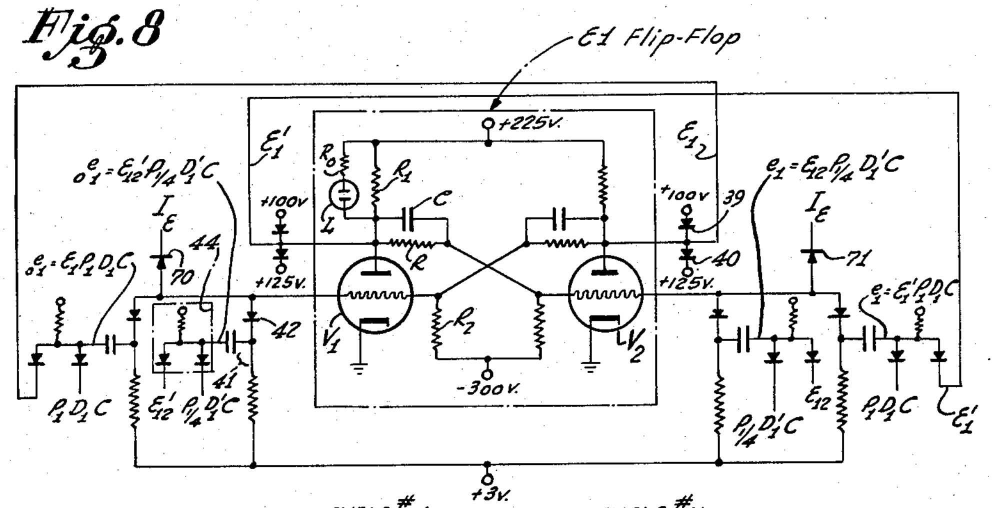
Fig. 8 shows a detailed circuit diagram of the E1 flip-flop circuit together with its trigger input networks.
Figure 9:
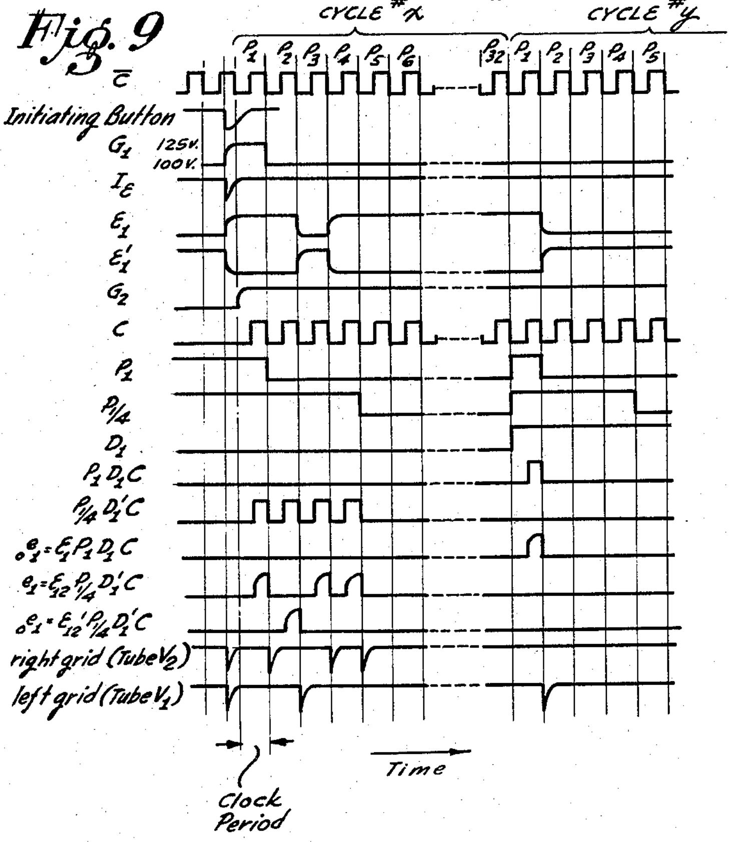
Fig. 9 is a time chart showing waveforms explaining the operation of the E1 flip-flop circuit.

Reference will next be made to Figs. 8 and 9 together in order to further describe and clarify the action of the circuits of the present computing device. As previously described, the E1 flip-flop of the E register has two functions. One of these is to act as the first stage of the four stage counter 58 which includes also flip-flops E2, E3, and E4. The other is to shift or step the coded decimal digits to the left in the E register. The trigger networks for enabling the E1 flip-flop to perform these functions, together with the logical equations defining them, are shown in Fig. 8 as an aid to the explanation which follows.

In Fig. 9, graphs of waveforms appearing at different points of the E1 flip-flop are shown. The regularly recurring clock pulses $\bar{C}$, as generated by pulse source 14, are shown to be a square wave. As noted in Fig. 1, depressing the initiating button 62 causes an input capacitor 64 to discharge to ground creating a sharp negative potential drop on line 65. This drop in potential is differentiated by capacitor 66 and resistor 67 to form a negative pulse 68 which triggers the G1 flip-flop into a "true" state. This action results in the G2 flip-flop being turned "on" so that clock gate 43 is open permitting clock pulses C to be impressed on all the networks. Depressing the initiating button 62 also causes a negative pulse $I_E$ to be generated on line 63 when mechanical switch 35 is set for multiplication. As shown in Fig. 8, this pulse $I_E$ is impressed via diodes 70 and 71 directly onto the respective grids of tubes $V_1$ and $V_2$, thus causing whichever tube is conducting to be cut-off, and the flip-flop to consequently change state. All of the E flip-flops in the E register have this reversing pulse $I_E$ applied simultaneously to its grids. This causes the multiplier initially placed in the E register to reset to its nine's complement.

As noted by the waveforms in Fig. 9, the E1 flip-flop is assumed to be initially storing a digit "zero," i.e., tube $V_2$ is conducting, causing output $E_1$ to be at the low potential of +100 v. and output $E_1'$ to be at the high potential of +125 v. As a result of the reversing of its condition by the $I_E$ pulse, output $E_1$ is swung to a high potential and output $E_1'$ is swung to a low potential, as shown. At the end of the first clock period, during which $G_1$ is swung to a high potential, output $G_2$ of the G2 flip-flop is rendered high in potential, thus enabling clock gate 43 (see Fig. 1) to activate the computing circuitry by passing clock pulses C to all the networks, as previously described.

As noted in connection with Fig. 6, the E1 flip-flop has two alternate actions which it may follow. If the D1 flip-flop is true during a computation cycle, the E1 flip-flop will function as a stage of a counter 58 along with the E2, E3, and E4 flip-flops. On the other hand, if the D1 flip-flop is in a false state at the beginning of a computation cycle, the trigger equations of the E1 flip-flop function to step data from the E12 flip-flop into the E1 flip-flop during pulse periods $P_{1/4}$. The waveforms $P_1$ and $P_{1/4}$ are shown in Fig. 9 during each of the computation cycles designated #x and #y.

During cycle #x, the D1 flip-flop is assumed to be in a false state, as noted by waveform $D_1$ being at a low potential. Thus the stepping trigger equations of the E1 flip-flop are effective. These equations are $$e_1=E_{12}P_{1/4}D_1'C$$

and $${}_0e_1=E_{12}'P_{1/4}D_1'C$$

The waveform of the combination of terms $P_{1/4}D_1'C$ is shown to be equivalent to the first four clock pulses C of the cycle. Note that it is only when the waveforms of the terms comprising a product are all high in potential during a clock period that the waveform of the combination is high in potential. The E12 flip-flop (waveform not shown) is assumed to be storing binary digits 1, 0, 1, 1 in that order during pulse periods $P_1$, $P_2$, $P_3$, and $P_4$, respectively, of cycle #x. Thus, equation $e_1=E_{12}P_{1/4}D_1'C$ has a high potential waveform during pulse periods $P_1$, $P_3$, and $P_4$; and equation $$_0e_1=E_{12}'P_{1/4}D_1'C$$

has a high potential waveform during pulse period $P_2$, as shown. These latter waveforms are differentiated and the negative pulses created are applied onto the grids of the tubes. Thus at the end of clock periods $P_1$, $P_3$, and $P_4$, negative pulses are applied onto the right grid, i.e., the grid of tube $V_2$; and at the end of clock period $P_2$, a negative pulse is applied onto the left grid, i.e., the grid of tube $V_1$. This results in the E1 flip-flop storing the binary digits 1, 0, 1, 1, in order, during pulse periods $P_2$, $P_3$, $P_4$, and $P_5$, respectively, of cycle #x.

When the D1 flip-flop is true, i.e., output $D_1$ is high in potential during a computation cycle, the E1 flip-flop count equations, $e_1=E_1'P_1D_1C$ and $_0e_1=E_1P_1D_1C$, are made effective. Thus when the E1 flip-flop is in a true state at $P_1$ time, as shown for cycle #y, equation $_0e_1=E_1P_1D_1C$ is made effective, as indicated by its waveform, causing a negative pulse to be applied onto the left grid, i.e., the grid of tube $V_1$, thus triggering the E1 flip-flop to a false state.

It is now evident that the clock pulse period may be considered as dividing the timing of the circuit operations into two distinct phases. During the first part of a clock pulse period, when the voltage from the clock source is low, the transients of the circuitry are occurring. For reliability, these should be completed before the leading edge of the clock pulse C arrives. During the time of the clock pulse C, the logical networks can be thought of as observing the flip-flops and the other sources of inputs so as to know if a pulse should pass onto the grid of any of the flip-flops. The clock pulse C must be broad enough so that, taking into account its rise time, it reaches its maximum voltage level before the end of the clock period. The clock pulse C must also have a low impedance source, so that a square edge can be created on the trailing end of the pulse passing through the grid gates. These conditions make it possible to create, by differentiation, the negative pulse, coincident with the end of the clock period, which is needed to trigger the flip-flops.

*Division*

The circuitry will now be described with reference to the valuation of a problem in division, which is characterized by mechanical switch 35 being properly set to connect the D1 flip-flop to the output of the comparing network 26, and connecting the initiating pulse $I_A$ to the grid inputs of all the A register flip-flops. As shown in Fig. 15, the process is broken down by showing the contents of each of the A, B, and E registers, the count in the Q counter, and the state of the D1 flip-flop at the beginning of each cycle of the computation.

As shown in Fig. 17, initially, coded decimal digits of the dividend are assumed to have been already set-up in the A17 through A28 flip-flops of the A register. Four flip-flops are required to set-up each coded decimal digit, such as the binary code for decimal digit "one" (see Fig. 14) which is set-up in the A17 to A20 flip-flops, inclusive. The coded decimal digits "zero" are placed in the first three groups of flip-flops A5–A8, A9–A12, A13–A16, as well as the last group of flip-flops A29–A32. In addition the summer 15 is assumed to be initially storing a coded decimal digit "zero" therein. The coded decimal digits of the divisor are located in the B17 through B28 flip-flop positions in the B register, and the remaining groups of B flip-flops, including the first group, B1–B4, have binary coded decimal digits "zero" set-up therein.

The E register and the Q counter are initially cleared to a "zero" content, while the D1 flip-flop is set to start off in a false state as represented by term $D_1'$ being high in potential. Additionally, the P counter is set to indicate the $P_1$ count.

Upon the depressing of the initiating button 62, a negative pulse is impressed on the $I_A$ output of the initiating circuit (Fig. 1) which causes all the A register flip-flops, as well as the contents of summer 15, to change their state. This results in the nine's complement of the dividend being set-up in the A register as indicated in Fig. 17. In addition, the depressing of the initiating button 62, as previously described, causes flip-flops G1 and G2 to be activated, in turn, thus opening clock gate 43 which passes clock pulses C to all the networks.

During each cycle of the division routine that the D1 flip-flop is false, as a result of the comparison made during the previous computation cycle, the following actions take place:

(1) The divisor in the B register is inhibited from being received at the summer 15 and instead a binary code representing the decimal digit zero is fed into the $S_b$ input of the summer 15. This results in the complement of the dividend, or partial remainder, being recirculated in the A register without change.

(2) The divisor in the B register is stepped ahead one decimal digit position by routing the contents of the B5 flip-flop, rather than the B1 flip-flop, back into the B32 flip-flop of the B register.

(3) The quotient in the E register is stepped one decimal digit to the left during $P_{1/4}$ pulse times.

When, as a result of the comparison at the end of a computation cycle, i.e., $P_{32}$ pulse time, the D1 flip-flop is in a true state, the following actions occur during the succeeding cycle:

(1) The contents of the B5 flip-flop (divisor) is stepped into the summer on line $S_b$ and added therein to corresponding digits of the complement of the dividend as received on line $S_a$ from the A5 flip-flop of the A register. This sum (representing the complement of the partial remainder) is routed back into the A32 flip-flop of the A register.

(2) The quotient digit in the E1 through E4 flip-flops of the E register is increased by unity at $P_1$ pulse time.

(3) The divisor digits as received from the B1 flip-flop are rerouted back into the B32 flip-flop of the B register. That is, the contents of the B register is recirculated without shift.

In addition, during each cycle that the D1 flip-flop is false, the counting network 37 of the Q counter is activated at $P_1$ time, advancing this counter by one unit.

As a result of these actions during each computation cycle, that is, the actions as determined by the D1 flip-flop being in a true state, followed by the actions as determined by the D1 flip-flop being in a false state, each of the quotient digits is built up in the first four flip-flops E1 through E4 of the E register, and then shifted to the left.

If, for example, a particular quotient digit should be equivalent to a decimal 2, the D1 flip-flop would be true for two computation cycles, and as a result the E1–E4 flip-flops will register a binary coded decimal 2. The D1 flip-flop would then be false for the following major cycle during which $P_{1/4}$ pulse times thereof the contents of the E register is stepped to the left so as to free the E1–E4 flip-flops to count the computation cycles indicative of the next lower order digit of the quotient.

After 3 such computation cycles, during which the D1 flip-flop is false, the Q counter indicates its capacity count $R_3$, which triggers off the G2 flip-flop simultaneously with the D1 flip-flop being triggered false for the fourth time (see Fig. 13), thus preventing the clock pulses C from further actuating the circuits.

A description of the actions which occur during each of the computation cycles required for the solution of the problem in division, as shown in Fig. 15, will next be presented. It should be noted that the contents or conditions of the circuits at the beginning of each of the cycles is as shown, and any changes made during a cycle are noted by observing the conditions of the circuits at the beginning of the succeeding cycle.

At the beginning of computation cycle #1, the dividend set up in the A register flip-flop has already been inverted such that its nine's complement is stored therein. The D1 flip-flop is initially in a false state. Consequently the digits in the A register pass through summer 15 without change while the digits in the B register, representing the divisor, are shifted ahead one decimal digital position (as noted by observing conditions at the beginning of cycle #2) and compared in comparing network 26 with the true digits of the dividend. Note that the complement of the dividend in the A register is again complemented by inverter 28, so as to obtain the true value of the dividend for the comparison. As a result of this comparison, the dividend is found to be greater than the divisor, resulting in the K1 flip-flop and the D1 flip-flop, which follows it, ending up in a true state. In addition to the above, the Q counter advances from count $R_0$ to $R_1$ at $P_1$ pulse time, and the contents of the E register (which at the present time is merely filled with coded decimal "zeros") is shifted one decimal digital position to the left. As previously described, the E register functions to accumulate the quotient digits.

Since D1 is true coming into cycle #2, corresponding digits stored in the A and B registers are added in summer 15 and the resulting sum is rerouted back into the A register. The complement of this resulting sum is compared in comparing network 26 with the divisor digits being received from flip-flop B1. It should be noted that the divisor digits are compared with the inverted sum digits as the latter are generated by the summer 15. Since the value of the partial remainder is greater than the divisor, the K1 flip-flop is set true and consequently the D1 flip-flop remains true at $P_{32}$ time. Additionally, the counting network 31 of the E register is activated at $P_1$ pulse time so that the E register content becomes 001.

The D1 flip-flop being again true during cycle #3, the numbers shown are added in summer 15 as in the previous cycle. However, the comparison in this instance shows that the partial remainder is less than the divisor and consequently the D1 flip-flop ends up in a false state. The counting network 31 of the E register is again activated at $P_1$ time resulting in its content changing to 002.

The D1 flip-flop is in a false state during cycle #4 as a result of the comparison during the previous cycle. The routine for this cycle is consequently similar to that of cycle #1, i.e., the addition is inhibited from taking place and the divisor is shifted one decimal digital position to the right. As a result of the comparison, the partial remainder is still found to be less than the true value of the divisor and the D1 flip-flop remains in a false state. During $P_1$ time, the Q counter advances from count $R_1$ to $R_2$ and the contents of the E register is shifted one decimal digital position to the left at $P_{1/4}$ pulse times. The content of the E register is now equivalent to 020.

During cycle #5 the D1 flip-flop is again false. Thus the addition is again inhibited resulting in the digits in the A register remaining unchanged, while the digits in the B register are shifted ahead one decimal digital position. As a result of the comparison the partial remainder is now found to be greater in magnitude than the divisor and the D1 flip-flop ends up in a true state. The Q counter advances from $R_2$ to $R_3$ at $P_1$ time and the E register is shifted one decimal digital position to the left such that its content is 200.

During cycle #6, the D1 flip-flop now being true, corresponding digits in the B registers are added to the A register and as a result of the comparison the partial remainder is found to be greater than the divisor resulting in the D1 flip-flop remaining true. The E register counting network 31 is activated resulting in its content being 201.

The actions of cycles #7, #8, #9, and #10 are all similar to cycle #6, resulting in the E register increasing its content to 205. During the comparison of cycle #10, however, the partial remainder is found to be less than the divisor and the D1 flip-flop ends up in a false state. This latter condition, together with the Q counter indicating an $R_3$, operates to trigger "off" the G2 flip-flop. This closes clock gate 43, and prevents clock pulses C from further actuating the networks, thus ending the computation. The answer to the problem is the quotient 205 as found in the E register. It should be noted that the remainder is stored in its complemented form in the A register.

*Multiplication*

The operation of the circuitry will now be described with reference to the solution of a problem of multiplication. For this type of operation, the mechanical switch 35 is set such that the D1 flip-flop is controlled in accordance with whether the digit in the E1–E4 flip-flops of the E register is a "nine" or "not nine." In addition, the setting of the switch results in the initiating circuitry being connected such that output $I_E$ is applied to the grids of all the E register flip-flops.

Initially the B register has the binary coded decimal digits of the multiplicand set up therein similarly to that described for the introduction of the divisor therein, while the multiplier digits are set up in the E register. The A register, as well as summer 15, is cleared to indicate coded decimal "zeros." The A register functions to accumulate the product.

On tapping the initiating button 62, a negative pulse is impressed on output $I_E$ of the initiating circuitry (Fig. 1) causing all the E register flip-flops to reverse their state. The E register thus starts off with the 9's complement of the true multiplier therein. This value is noted to be 896.

During each cycle of the multiplication routine that the D1 flip-flop is false, as a result of observing the contents of the E3–E4 flip-flops during the end of the previous computation cycle, the following actions take place:

(1) The multiplicand in the B register is inhibited from being received at the summer 15 and instead a binary code representing the decimal digit zero is fed into the $S_b$ input of summer 15. This results in the partial product being recirculated in the A register without change.

(2) The multiplicand in the B register is shifted ahead one decimal digital position by routing the contents of the B5 flip-flop, rather than the B1 flip-flop, back into the B32 flip-flop of the B register.

(3) The complement of the multiplier in the E register is shifted one decimal digital position to the left during $P_{1/4}$ pulse times.

When, as a result of observing the contents of the E1–E4 flip-flops, the D1 flip-flop ends up in a true state, the actions during the succeeding cycle are as follows:

(1) The contents of the B5 flip-flop of the B register (multiplicand) is stepped into the summer on line $S_b$ and added therein to corresponding digits of the partial product as received on line $S_a$ from the A5 flip-flop of the A register.

(2) The nine's complement of the multiplier digit in the E1–E4 flip-flops of the E register is increased by unity at $P_1$ pulse time.

(3) The multiplicand digits as received from the B1 flip-flop are rerouted back into the B32 flip-flop of the B register. That is, the contents of the B register is recirculated without being shifted.

In addition, during each cycle that the D1 flip-flop is false, the counting network 37 of the Q counter is activated at $P_1$ time, advancing this counter by one unit. The multiplication process will be further clarified by a description of the cycles of the routine as set forth in Fig. 16.

At the beginning of cycle #1, the D1 flip-flop starts out in a false state. Hence, the contents in the A register (which is equivalent to decimal "zero") passes through the summer 15 without change, and the digits of the multiplicand in the B register are shifted one decimal digital position to the right. The Q counter is activated at $P_1$ time to indicate count $R_1$, while the shifting network of the E register shifts the decimal digits to the left during $P_{1/4}$ pulse times. This results in the E register content being equal to 968. The D1 flip-flop is set in accordance with the contents of the E1 to E4 flip-flops of the E register. In this instance, since this content is not equal to 9, the D1 flip-flop is set true at $P_{32}$ time.

During cycle #2 with the D1 flip-flop true, the digits of the B register are added into the A register which is storing the partial product. In addition a unit is added to the E1 to E4 flip-flops at $P_1$ time resulting in its content changing from 8 to 9. Because the content of E1 to E4 is now equal to 9, the D1 flip-flop is set false at $P_{32}$ time.

The false state of the D1 flip-flop during cycle #3 results in an action similar to that described in cycle #1. The B register is shifted one decimal digital position to the right, the Q counter advances to count $R_2$ at $P_1$ time, and the shifting network of the E register shifts the decimal digits therein to the left during $P_{1/4}$ pulse times, causing its new content to be 699. Thus at $P_{32}$ pulse time the D1 flip-flop remains in a false state since the digit set up in flip-flops E1–E4 is equivalent to decimal 9.

The false state of the D1 flip-flop during cycle #4 results in again shifting the digits in the B register, advancing the Q counter to count $R_3$ at $P_1$ time, and shifting the digits in the E register during $P_{1/4}$ time such that its contents becomes 996. The D1 flip-flop is thus triggered true at $P_{32}$ time since the contents of the E1 to E4 flip-flops is less than 9.

The actions of cycles #5, #6, and #7 are all similar since the D1 flip-flop remains true, as indicated in Fig. 16. Consequently, the contents of the B register is added into the A register during each of the cycles. In addition, a unit is added to the digits in the E1–E4 flip-flops at $P_1$ time of each cycle resulting in its content being made equivalent to 9 during cycle #7. It thus follows that the D1 flip-flop is set false at the end of cycle #7. Also as a result of this condition existing simultaneously with the Q counter indicating an $R_3$ count, the G2 flip-flop is triggered into a false state at the end of the cycle. This closes clock gate 43, preventing further clock pulses C from activating the networks, and the computation stops. The answer, representing the product, is found in the A register, as indicated in Fig. 16.

It should be understood that the contents of the B register is always added into the A register to perform both the addition of its contents to the partial product as required during multiplication, and to effectively perform the subtraction of its contents from the dividend or partial remainder as required during division. It should be noted that this method of subtraction is made equivalent to addition by adding the true value of the subtrahend to the nine's complement of the minuend, as long as the true value of the minuend is greater than or equal to the subtrahend. The sum represents the nine's complement of the difference.

This same procedure is utilized in the E register. Thus note that a unit is always added at $P_1$ time to the contents of the E1 to E4 flip-flops. Thus during division, the unit is added to the true contents of the E1 to E4 flip-flops to obtain the quotient digits; whereas, during multiplication, the unit is added to the nine's complement of the multiplier digits, thus effecting a subtraction of the unit from the multiplier digits. Since this latter operation involves effectively subtracting a unit at a time, the test, as to when the true value of the minuend is no longer greater than or equal to the subtrahend (namely, unity), is derived by noting when the complemented form of the minuend is equal to "nine," which is the same as determining when the true form of the minuend is equal to "zero."

While the circuits as shown and described herein are admirably adapted to fulfill the objects and features of advantage previously enumerated as desirable, it is to be understood that the invention is not to be limited to the specific features shown but that the means and construction herein disclosed are susceptible of modification in form, proportion, and arrangement of parts without departing from the principle involved or sacrificing any of its advantages, and the invention is therefore intended to include embodiments of various forms all coming within the scope of the claims which follow.

What is claimed is:

1. An electronic calculating device comprising first, second, and third digit shifting and storage register means each arranged and adapted for cyclically recirculating signals indicative of binary coded decimal digits therein; sensing means for sensing signals indicative of a binary coded digit in the first digital position of said third register and for providing a control signal representative of a sensing; adding means connected to said first register and to said second register and said sensing means and operable during a recirculation cycle to add the signal indication in said second register to the signal indiciation in said first register and to add a unit to the signal indication in the first digital position of said third register in response to said control signal when the results of said sensing means during the previous recirculation cycle indicates the signals stored in said first digital position of said third register represents a digit less than a digit nine; and means connected to and responsive to said sensing means and connected to said second and third register means and operable during a recirculation cycle to cause shifting of the signals indicative of decimal digits in said second and third registers one decimal digital position when the result of said sensing means during the previous recirculating cycle indicates the signals in the first digital period of said third register represents a decimal digit nine, whereby the number of units added to the signal indication in the first digital position of said third register prior to being shifted by said shifting means represents the number of successive recirculating cycles that the signal indication of said second register is added to the first register.

2. In a calculating device for performing multiplication, a first series of flip-flops for storing binary coded signals representing digits of a product to be generated; a second series of flip-flops for storing binary coded signals representing a multiplicand; a third series of flip-flops for storing binary coded signals representing a multiplier; means for inducing inversion of the binary coded signals in said third series of flip-flops to cause said third series of flip-flops to store the complement of the multiplier; summating means connected to each of said first and second series of flip-flops for adding the binary coded signals of said second series with the binary coded signals of said first series of flip-flops and including means for returning the sum signals to said first series of flip-flops; means including counting means for adding a binary unit to the first digital position of the third series of flip-flops in response to a control signal; means for sensing the binary coded signals in the first digital position of the third series of flip-flops and producing said control signal in response thereto; means capable of inducing relative shifting of the signals in the second and third series of flip-flops with respect to the signals in the first series of flip-flops; means connected to said sensing means and said shift inducing means for rendering said shift inducing means operable and inhibiting said summating means from operating with the signals in said second series of flip-flops and preventing said counting means from operating when the digit being sensed by said sensing means is equal to a decimal digit nine, and for rendering said summating means and counting means operable and inhibiting said shift inducing means from operating when the digit being sensed by said sensing means is less than a decimal digit nine.

3. A calculating device comprising a first, second, and third storage register; means for recirculating signals representing a numerical set-up in said first and second registers; a summer included in said first register capable of serially adding the signals set-up in said second register into said first register; a counter included as the first digital position of said third register; means for serially comparing the signals set-up in said second register with the nines complement of the output of said summer to determine their relative magnitude; means for sensing signals being stored in the counter of said third register; means for shifting signals in said second and third registers; a bistable state control means; switching means for setting said control means in accordance with either the output of said comparing means or said sensing means; means responsive to one state of said control means to inhibit said summer and said counter from effectively operating and to render said shifting means operable; and means responsive to the other state of said control means to render said summer and said counter operable and to inhibit said shifting means from operating, whereby when said switching means connects said comparing means to said control means, the circuits are operable to perform the process of division, and when said switching means connects said sensing means to said control means, the circuits are operable to perform the process of multiplication.

4. A calculating device comprising first, second, and third storage registers; a summer capable of adding digital signals of said second register into said first register; means including inverter means connected to said first register by way of said summer, for producing the nines complement of the signals in said first register, and including means connected to the inverter means and to the second register for comparing the digital signals of said second register with the nines complement of the digital signals in said first register to determine their relative magnitude; a counting means for adding units to the digital signals in a predetermined portion of said third register; means for sensing the value of the digital signals in said predetermined portion of said third register; means for shifting signals in said second and third registers one digital position; a two state control means; switching means for setting said control means in accordance with either the output of said comparing means or said sensing means; means for rendering said summer operable only to pass signals with delay and said counting means inoperable and said shifting means operable when said control means is in one state; and means for rendering said summer and counting means operable and said shifting means inoperable when said control means is in the other state, whereby when said switching means connects said comparing means to said control means, the device is operable to perform the process of division, and when said switching means connects said sensing means to said control means, the device is operable to perform the process of multiplication.

5. In a cyclically operable calculating device for operating with excess-three binary-coded digit-representing signals stored therein, first, second, and third recirculating storage register means; means including inverter means, connected to said first storage register, for inverting the signals in said first register means to provide therein the nines-complement of the signals entered therein; means for recirculating digit-representing signals in said first and second register means; a first adding means capable of serially adding the digit-representing signals in said second storage register means to the digit-representing signals of said first storage register means during a recirculation; a second adding means capable of adding a unit to the digit-representing signals in the first digital position of said third storage register means during a recirculation; shifting means capable of shifting digit-representing signals set-up in said second and third recirculating storage register means during a recirculation; comparator means connected to said inverter means and to said second register means for comparing the digit-representing signals recirculating in said second register means with the nines-complement of the digit-representing signals from the first register means during each recirculation of said first and second register means; first control means connected to said comparator means for rendering said shifting means operable during a recirculation when said comparator means at the end of the previous recirculation indicates the nines-complement of the digit-representing signals in said first register means is less than the digit-representing signals in said second register means; and second control means for rendering both said adding means operable during a recirculation in response to said comparator means at the end of the previous recirculation indicating the nines-complement of the digit signals in said first register means is equal to or greater than the digit signals in said second register means.

6. In a cyclically operable calculating device, first, second, and third storage register means; means for recirculating digit-representing signals set-up in said first and second register means; a first adding means capable of operating during a recirculation to add the digit-representing signals set-up in said second register means into said first register means; a second adding means capable of operating during a recirculation cycle to add a unit to the digit-representing signal set-up in the first digital position of said third register means; means capable of operating during a recirculation cycle to shift digit-representing signals set-up in said second and third storage register means; means for sensing during each recirculation the digit signals set-up in the first digital position of said third register means, said sensing means generating a first type of control signal when the digit signal sensed is equivalent to a digit nine, and a second type of control signal when the digit signal sensed represents less than a digit nine; controlling means connected to said sensing means and responsive to the first type of said control signals for rendering said shifting means operable during a recirculation; means responsive to the second type of said control signals for rendering both said adding means operable during a recirculation; and means connected to said controlling means for counting the number of times said shifting means is rendered operable.

7. In a calculating device for performing division operations with binary-coded decimal digits represented by binary signals coded in the binary excess-three system and stored in registers in said device, first, second, and third recirculating storage register means each comprising a respective series of bistable state elements; means for inducing binary inversion of the signals stored in said first register means to cause to be stored therein signals representing the nines-complement of the digits represented by the signals first stored therein; stepping network means each associated with a respective one of said registers for stepping binary coded decimal digit signals from one bistable state element to the next in recirculating rings, said stepping networks for at least said first and second register means operable continually; a serial summing means included in the recirculating ring of said first register means for adding digit signals being stepped through said second register into said first register; a counting network associated with a group of bistable state elements in said third register means; an inverter-comparator network for inverting and producing the nines-complement of the signals from said summing means and serially comparing said nines-complement signals with the digit signals being stepped out of said second register means to determine their relative magnitude; means including a decision bistable state element set in accordance with said comparing network, said decision bistable state element being operable when in one state to route digit signals being stepped through said second register means into said summing means and to activate the counting network of said third register means, and said decision bistable state element being operable when in the other state to control the stepping networks of the second and third register means to shift the signals being stepped therein one digital position.

8. In a calculating circuit, first, second, and third electronic recirculating storage register means each comprising a plurality of bistable state elements; stepping networks associated with said register means, capable of stepping signals representing numerical information from one bistable state element to the next in respective closed rings, said stepping networks for at least said first and second register means normally operating continually during a calculating operation; a serial summing means connected to said first register and means including gating means connecting the second register to the summing means, said summing means being included in the ring forming the first register means, capable of adding signals being stepped through said second register means with those signals in said first register means; a counting network associated with predetermined bistable state elements corresponding to a digital position of said third register means; sensing network means responsive to the signals in said predetermined bistable state elements of said third register means; means including a decision bistable state element means connected to and set in accordance with said sensing network, said decision bistable state element means being connected to said gating means and operable when in one state to route signals being stepped through said second register means into said summing means and connected to and operable to activate the counting network of said third register means, and said decision bistable state element means being connected to be operable when in the other state to enable the respective stepping networks to shift signals in said second register means one digital position relative to the signals in said first register means, and to shift signals in said third register means one digital position.

9. In an electronic calculating device, means for performing over-and-over subtraction comprising a first register for storing binary coded signals representing a minuend; a second register for storing binary coded signals representing a subtrahend; means for initially inverting the binary coded signals in said first register to set-up therein signals representing the nines complement of the minuend; means for repeatedly adding the binary coded signals in said second register into said first register to produce therein cumulative signals representing successive cumulative results corresponding to the nines complement of the remainder; and means responsive to the cumulative signals at the end of each addition operation for terminating said repeat addition operation when the numerical value of the binary coded signals corresponding to the true form of the result in said first register is less than the value of the binary coded signals corresponding to the subtrahend in said second register.

10. An electronic calculating device for selectively dividing and multiplying binary-coded decimal numbers represented by binary signals coded in the binary excess-three system, comprising: first register means comprising a dividend-product recirculating register for storing and operating with excess-three coded binary signals; second register means comprising a divisor-multiplicand recirculating register for storing and operating with excess-three coded binary signals; third register means comprising a quotient-multiplier recirculating register for storing and operating with binary signals; coded-decimal summer means connected to said first and second register means for input thereto of signals from said register means and for producing output signals for recirculation in said first register means; inverter-comparator means connected to said summer means and to said second register means and effective to produce first and second types of primary control signals in response to comparisons of signals from said second register means and inversions of signals from said summer means; period counting and demarking means; counting network means connected to said third register means and operable to inccrease the count represented by the signals in said third register means for each addition in said summer means; sensing network means connected to said third register means and operable to produce first and second types of secondary control signals in dependence upon existence of first and second signal conditions, respectively, in said third register means; clock signal means including means supplying to the several means of the device a succession of electric clock-signals; two-condition selector means and control means connected to said selector means, operable to select either from among said primary and secondary control signals in respective first and second procedures and including means effective in said first procedure in response to selection of a primary control signal to induce inversion of the binary signals in said first register means and thereby cause addition in said summer means of the signals from said second register means with the binary complement of the signals previously in said first register means whereby the number represented in said first register means is divided by the number represented in said second register means, and said control means including means effective in said second procedure in response to selection of a secondary control signal to induce inversion of the binary signals in said third register means and cause addition in said summer means of the signals from said first and second register means whereby the number represented in said second register means is multiplied by the number represented in said third register means, said selector and control means including means utilizing said period counting and demarking means to induce relative signal-shifting of the signals in said second and third register means in response, respectively, to a primary control signal of the first type, and to a secondary control signal of the first type.

11. A device as defined in claim 10, in which a primary control signal of the first type is produced in response to comparison of signals by said inverter-comparator means, and a secondary control signal of the first type is produced in response to sensing a binary excess-three coded signal by said sensing network means.

References Cited in the file of this patent

UNITED STATES PATENTS

| | | |
|---|---|---|
| 2,445,215 | Flory | July 13, 1948 |
| 2,624,508 | Dickinson | Jan. 6, 1953 |
| 2,641,407 | Dickinson | June 9, 1953 |
| 2,686,632 | Wilkinson | Aug. 17, 1954 |
| 2,701,095 | Stibitz | Feb. 1, 1955 |
| 2,703,202 | Cartwright | Mar. 1, 1955 |
| 2,802,625 | Dickinson | Aug. 13, 1957 |
| 2,817,477 | Williams | Dec. 24, 1957 |

FOREIGN PATENTS

| | | |
|---|---|---|
| 742,869 | Great Britain | Oct. 3, 1952 |